United States Patent
Wengert et al.

(10) Patent No.: US 10,234,013 B2
(45) Date of Patent: Mar. 19, 2019

(54) GEARBOX ASSEMBLY FOR A TWIN-SCREW EXTRUDER, TREATMENT INSTALLATION FOR MATERIAL TREATMENT COMPRISING A GEARBOX ASSEMBLY OF THIS TYPE, AND METHOD FOR THE STARTUP OF A TREATMENT INSTALLATION COMPRISING A GEARBOX ASSEMBLY OF THIS TYPE

(71) Applicant: Coperion GmbH, Stuttgart (DE)

(72) Inventors: Bernhard Wengert, Auenwald (DE);
Raimund Schleicher, Marbach (DE);
Ralf Riehle, Dusslingen (DE)

(73) Assignee: Coperion GmbH, Stuttgart (DE)

( * ) Notice: Subject to any disclaimer, the term of this patent is extended or adjusted under 35 U.S.C. 154(b) by 582 days.

(21) Appl. No.: 14/709,691

(22) Filed: May 12, 2015

(65) Prior Publication Data
US 2015/0330496 A1    Nov. 19, 2015

(30) Foreign Application Priority Data
May 13, 2014 (EP) .................................... 14168171

(51) Int. Cl.
*F16H 57/02* (2012.01)
*F16H 1/22* (2006.01)
(Continued)

(52) U.S. Cl.
CPC .......... *F16H 57/02* (2013.01); *B29C 47/0801* (2013.01); *B29C 47/0805* (2013.01);
(Continued)

(58) Field of Classification Search
CPC ........ F16H 57/02; F16H 57/0434; F16H 1/22; F16H 2057/02069; F16H 2057/005;
(Continued)

(56) References Cited

U.S. PATENT DOCUMENTS 6,106,426 A * 8/2000 Morhard ............. B29C 47/0801
366/100
6,709,354 B2 * 3/2004 Yagi .................... B29C 47/0801
475/6
(Continued)

FOREIGN PATENT DOCUMENTS

DE 197 36 549 A1 2/1999
DE 101 01 255 A1 8/2001
(Continued)

*Primary Examiner* — Victor L Macarthur
(74) *Attorney, Agent, or Firm* — McGlew and Tuttle, P.C.

(57) ABSTRACT

A gearbox assembly for a twin-screw extruder comprises a speed change gearbox for adjusting a screw shaft speed of two screw shafts of the twin-screw extruder, a distribution gearbox allowing the screw shafts to be coupled thereto, and a speed reduction gearbox. The speed change gearbox and the speed reduction gearbox are configured such as to be separable from each other, wherein the speed change gearbox is arranged at a driving end while the speed reduction gearbox couples the speed change gearbox to the distribution gearbox. Due to the fact that the speed change gearbox is configured as an individual gearbox unit arranged at the driving end, an adjustment of the screw shaft speed is easily possible by replacing the speed change gearbox. As a result, a high flexibility and productivity are obtained in the operation of the twin-screw extruder.

18 Claims, 5 Drawing Sheets

(51) Int. Cl.
  *F16H 57/04*  (2010.01)
  *B29C 47/08*  (2006.01)
  *B29C 47/40*  (2006.01)
  *F16H 57/00*  (2012.01)
  *B29B 7/46*  (2006.01)
  *B29B 7/58*  (2006.01)

(52) U.S. Cl.
  CPC ........ *B29C 47/0818* (2013.01); *B29C 47/402* (2013.01); *F16H 1/22* (2013.01); *F16H 57/0434* (2013.01); *B29B 7/46* (2013.01); *B29B 7/586* (2013.01); *F16H 2057/005* (2013.01); *F16H 2057/02069* (2013.01); *F16H 2057/02073* (2013.01); *Y10T 74/19084* (2015.01)

(58) Field of Classification Search
  CPC ..... F16H 2057/02073; Y10T 74/19084; B29C 47/0805; B29C 47/0801; B29C 47/0818; B29C 47/402; B29B 7/586; B29B 7/46
  USPC .............................................. 74/665 F, 665 G
  See application file for complete search history.

(56) References Cited

U.S. PATENT DOCUMENTS

| | | |
|---|---|---|
| 2001/0008372 A1 | 7/2001 | Yagi et al. |
| 2007/0191169 A1 | 8/2007 | Fujita et al. |
| 2009/0010094 A1 | 1/2009 | Uemura |

FOREIGN PATENT DOCUMENTS

| | | |
|---|---|---|
| EP | 1 854 531 A1 | 11/2007 |
| EP | 2 397 304 A1 | 12/2011 |

* cited by examiner

GEARBOX ASSEMBLY FOR A TWIN-SCREW EXTRUDER, TREATMENT INSTALLATION FOR MATERIAL TREATMENT COMPRISING A GEARBOX ASSEMBLY OF THIS TYPE, AND METHOD FOR THE STARTUP OF A TREATMENT INSTALLATION COMPRISING A GEARBOX ASSEMBLY OF THIS TYPE

CROSS-REFERENCE TO RELATED APPLICATIONS

This application claims the priority of European Patent Application, Serial No. EP 14 168 171.8, filed on 13$^{th}$ May 2014, pursuant to 35 U.S.C. 119(a)-(d), the content of which is incorporated herein by reference in its entirety as if fully set forth herein.

FIELD OF THE INVENTION

The invention relates to a gearbox assembly for a twin-screw extruder comprising a speed change gearbox for adjusting a screw shaft speed of two screw shafts of a twin-screw extruder, a speed reduction gearbox, a distribution gearbox with two distribution gearbox output shafts allowing the screw shafts of the twin-screw extruder to be coupled thereto. The invention further relates to a treatment installation for material treatment comprising a gearbox assembly of this type. The invention further relates to a method for the startup of a treatment installation comprising a gearbox assembly of this type.

BACKGROUND OF THE INVENTION

A driving apparatus for a twin-screw extruder is known from DE 101 01 255 A1 (corresponding to US 2001/008 372 A1). The driving apparatus comprises a gearbox driven, at the input end, by a main motor and an auxiliary motor while the output end thereof is connected to the screw shafts of the twin-screw extruder. The gearbox comprises a superposition gear mechanism configured as a planetary gear mechanism, a distribution gearbox and a speed change gearbox. The speed change gearbox serves to ad-just the rotational speed or speed of the screw shafts. To change the speed, one pair of gears is replaced by another pair of gears having a different gear ratio.

SUMMARY OF THE INVENTION

The invention is based on the object of providing a gearbox assembly that ensures a high flexibility and a high productivity in the operation of a twin-screw extruder.

This object is achieved by a gearbox assembly for a twin-screw extruder, the gearbox assembly comprising a speed change gearbox for adjusting a screw shaft speed of two screw shafts of a twin-screw extruder, a speed reduction gearbox, a distribution gearbox with two distribution gearbox output shafts allowing the screw shafts of the twin-screw extruder to be coupled thereto, wherein the speed change gearbox is arranged at a driving end, wherein the speed reduction gearbox couples the speed change gearbox to the distribution gearbox, and wherein the speed reduction gearbox has precisely one speed reduction gearbox input shaft, and a speed change gearbox output shaft of the speed change gearbox is detachably connected to the speed reduction gearbox input shaft so that the speed change gearbox and the speed reduction gearbox are configured such as to be separable from each other. Due to the fact that the speed change gearbox is mounted to the input end of the gearbox assembly and is configured such as to be separable from the speed reduction gearbox, the gear ratio of the gearbox assembly is easily changeable by replacing the speed change gearbox. It was recognized according to the invention that the gear ratio can be adjusted more easily and quickly if the entire speed change gearbox is replaced instead of simply replacing the gears of the speed change gearbox, as is known from prior art. To this end, the speed change gearbox is configured as an individual gearbox module, in other words as an individual gearbox unit physically separated from the speed reduction gearbox. The speed change gearbox has a gear ratio $i_W$ the absolute value of which is such that $i_W \neq 1$. This means that the gear ratio of the speed change gearbox may be greater or smaller than 1, depending on what is required. The speed change gearbox in particular has a single-stage configuration. The speed reduction gearbox couples the speed change gearbox to the distribution gearbox. The speed reduction gear has a gear ratio $i_R$ the absolute value of which is such that $i_R > 1$. The speed reduction gearbox in particular has a single-stage configuration. Due to the fact that the speed change gearbox is configured as an individual gearbox module, the speed change gearbox can be easily and quickly replaced by another speed change gearbox. This allows the gear ratio to be changed quickly, thus ensuring a high flexibility in the operation of the twin-screw extruder as well as a high productivity as a result of reduced downtimes. Furthermore, in the event of an upcoming maintenance and/or a defect, the speed change gearbox is just as easily and quickly replaceable by another speed change gearbox. This reduces downtimes as well, thus ensuring a high productivity. The gearbox assembly preferably serves to drive a twin-screw extruder for rotation in the same direction.

The gearbox assembly ensures an easy and quick replacement of the speed change gearbox, and therefore leads to a high flexibility and productivity in the operation of a twin-screw extruder. The speed change gearbox output shaft and the speed reduction gearbox input shaft form a detachable shaft connection that is easily detachable when replacing the speed change gearbox, thus allowing the speed change gearbox output shaft to be easily and quickly separated from the speed reduction gearbox input shaft. The speed reduction gearbox has precisely one speed reduction gearbox input shaft.

A gearbox assembly provided with a speed change gearbox that has a speed change gearbox input shaft at the driving end allowing a drive motor to be detachably coupled thereto ensures an easy and quick replacement of the speed change gearbox, and therefore leads to a high flexibility and productivity in the operation of a twin-screw extruder. Due to the fact that the speed change gearbox input shaft is detachably coupled to a drive shaft of the drive motor, in other words they form a detachable shaft connection, the speed change gearbox is quickly separable from the drive motor in the event of an upcoming replacement. The detachable shaft connection is in particular formed by a coupling between the drive motor and the speed change gearbox. To this end, the coupling has a coupling element at the input end, the coupling element being mounted to the drive shaft, as well as a coupling element at the gearbox, the latter being mounted to the speed change gearbox input shaft, with the coupling elements being connected to each other in a torque transmitting manner via a friction element. The friction element is detachably mounted to one of the coupling elements, thus allowing the shaft connection to be separated by demounting the friction element. Preferably, the speed change gearbox has precisely one speed change gearbox input shaft.

A gearbox assembly in which the speed change gearbox output shaft has a gear disposed at the output end thereof, with the speed change gearbox output shaft being mounted, by means of radial bearings, on both sides of the gear, in particular to a speed change gearbox housing, ensures an easy and quick replacement of the speed change gearbox, and therefore leads to a high flexibility and productivity in the operation of a twin-screw ex-trader. Due to the fact that the speed change gearbox output shaft is mounted in radial bearings on both sides of the gear, the mounting of the speed change gearbox output shaft is independent of a mounting of the speed reduction gearbox input shaft connected thereto. As a result, the speed change gearbox output shaft is securely and reliably mounted both during operation and during a replacement of the speed change gearbox. Preferably, a speed change gearbox input shaft is mounted in radial bearings on both sides of an input gear disposed on the speed change gearbox input shaft. As a result, the speed change gearbox input shaft is securely and reliably mounted both during operation and during a replacement as well. The speed change gearbox input shaft is in particular mounted to a speed change gearbox housing configured separately, in other words it is separate from a speed reduction gearbox housing.

A gearbox assembly the speed reduction gearbox input shaft of which has a gear disposed at the input end thereof, with the speed reduction gearbox input shaft being mounted, by means of radial bearings, on both sides of the gear, in particular to a speed reduction gearbox housing, ensures an easy and quick replacement of the speed change gearbox, and therefore leads to a high flexibility and productivity in the operation of a twin-screw extruder. Due to the fact that the speed reduction gearbox input shaft is mounted in radial bearings on both sides of an input gear, the mounting of the speed reduction gearbox input shaft is independent of the mounting of the speed change gearbox output shaft connected thereto. Preferably, the speed reduction gearbox has precisely one speed reduction gearbox input shaft.

A gearbox assembly provided with a speed change gearbox housing of the speed change gearbox and a speed reduction gearbox housing of the speed reduction gearbox configured such as to be separate from each other ensures an easy and quick replacement of the speed change gearbox, and therefore leads to a high flexibility and productivity in the operation of a twin-screw extruder. Due to the separate configuration of the speed change gearbox housing and the speed reduction gearbox housing, the speed change gearbox is replaceable entirely, including the associated housing, thus facilitating the replacement. The speed change gearbox housing may for instance have suitable fastening elements for a lifting device, allowing the speed change gearbox to be replaced easily and quickly by means of the lifting device. In operation, the speed change gearbox housing and the speed reduction gearbox housing are interconnected by means of detachable fastening means. The fastening means are easily accessible, thus allowing them to be detached easily and quickly, if necessary.

A gearbox assembly the speed change gearbox of which has a speed change gearbox housing, with a speed change gearbox input shaft and the speed change gearbox output shaft being mounted thereto, wherein the speed change gearbox housing has a connection portion for connection to a speed reduction gearbox housing of the speed reduction gearbox, the connection portion being configured in such a way that the speed change gearbox input shaft is positionable in a plurality of angular positions relative to the speed change gearbox output shaft, ensures an easy and quick manner of aligning the speed change gearbox relative to a drive motor, thus allowing the drive motor to be easily and quickly coupled to the gearbox assembly. The connection portion of the speed change gearbox housing allows the speed change gearbox input shaft to be positioned in different angular positions relative to the speed change gearbox output shaft the position of which is fixed. The different angular positions in particular allow the vertical position of the speed change gearbox input shaft to be changed in order to be adapted to the vertical position of the drive shaft of a drive motor. The angular positions can be discrete angular positions and/or an at least partly continuous angular range.

A gearbox assembly provided with at least one lubricant line having a predetermined separation point, the lubricant line running between the speed change gearbox and the speed reduction gearbox while being arranged in particular outside a speed change gearbox housing and a speed reduction gearbox housing, ensures an easy and quick replacement of the speed change gearbox, and therefore leads to a high flexibility and productivity in the operation of a twin-screw extruder. The predetermined separation point allows the at least one lubricant line to be separated easily and quickly when replacing of the speed change gearbox. The predetermined separation point is preferably disposed outside the speed change gearbox housing and the speed reduction gearbox housing and can be separated before separating the housings. To this end, the at least one lubricant line is for instance configured as a hose between the speed change gearbox and the speed reduction gearbox, the hose having a predetermined separation point in the form of a quick-release coupling. Inside the speed change gearbox housing and/or the speed reduction gearbox housing, the at least one lubricant line is in particular formed by at least one fixed pipe and/or a fixed bore. In the separated state, the quick-release coupling is preferably self-sealing while in the mounted state, it is self-locking.

A gearbox assembly provided with a speed change gearbox that has a coding element for reading out a gear ratio ensures an easy and quick reinstatement after a replacement of the speed change gearbox. The coding element contains information regarding the gear ratio of the speed change gearbox. By means of a reading unit, the information of the coding element can be read out and transmitted, in particular automatically, to a control device, which is part of a treatment installation for material treatment. The treatment installation comprises the gearbox assembly according to the invention, a drive motor and a twin-screw extruder as well as the control device and the reading device. By means of the control device, the gear ratio of the gearbox assembly can be determined as a function of the read-out gear ratio of the speed change gearbox to be determined, thus allowing the drive motor and/or the twin-screw extruder to be actuated correspondingly. By means of the coding element, the information may for instance be read out mechanically or optically.

A gearbox assembly provided with a speed reduction gearbox having a speed reduction gearbox output shaft that is detachably connected to a distribution gearbox input shaft of the distribution gearbox ensures an easy and quick replacement of the speed reduction gearbox in the event of an upcoming maintenance or a defect. The speed reduction gearbox is configured such as to be separable from the distribution gearbox. The speed reduction gearbox is therefore configured as an individual gearbox module, in other words an individual gearbox unit. The speed reduction gearbox can therefore be separated from the speed change gearbox and the distribution gearbox easily and quickly in order to be replaced by another speed reduction gearbox. To this end, the speed reduction output shaft is detachably connected to the distribution gearbox input shaft. In other words, the speed reduction gearbox output shaft and the distribution gearbox input shaft form a detachable shaft connection. In the event of an upcoming maintenance, the speed reduction gearbox to be maintained is simply replaced by a new or maintained speed reduction gearbox, with the result that the downtime of the twin-screw extruder is reduced considerably while the productivity and availability thereof are increased.

A gearbox assembly provided with a speed reduction gearbox that has a speed reduction gearbox output shaft and a gear disposed at the output end thereof, with the speed reduction gearbox output shaft being mounted, by means of radial bearings, on both sides of the gear, in particular to a speed reduction gearbox housing, ensures an easy and quick replacement of the speed reduction gearbox, and therefore leads to a high productivity in the operation of a twin-screw extruder. Due to the fact that the speed reduction gearbox output shaft is mounted in radial bearings on both sides of the output gear, the mounting of the speed reduction gearbox output shaft is independent of the mounting of a distribution gearbox input shaft connected thereto. As a result, the speed reduction gearbox output shaft is securely and reliably mounted during a replacement of the speed reduction gearbox.

A gearbox assembly provided with a distribution gearbox that has a distribution gearbox input shaft and a gear disposed at the input end thereof, with the distribution gearbox input shaft being mounted, by means of radial bearings on both sides of the gear, in particular to a distribution gearbox housing, ensures an easy and quick replacement of the speed reduction gearbox, and therefore leads to a high productivity in the operation of a twin-screw extruder. Due to the fact that the distribution gearbox input shaft is mounted in radial bearings on both sides of an input gear, the mounting of the distribution gearbox input shaft is independent of the mounting of a speed reduction gearbox output shaft connected thereto. As a result, the distribution gearbox input shaft is securely and reliably mounted during a replacement of the speed reduction gearbox.

A gearbox assembly provided with a speed reduction gearbox housing of the speed reduction gearbox and a distribution gearbox housing of the distribution gearbox, the gearbox housings being configured such as to be separate from each other, ensures an easy and quick replacement of the speed reduction gearbox. Due to the fact that the speed reduction gearbox housing is configured separately from the distribution gearbox housing, the entire speed reduction gearbox, including the housing, is replaceable. The speed reduction gearbox housing in particular has suitable fastening means for a lifting device so the speed reduction gearbox is replaceable easily and quickly using the lifting device. Preferably, the speed reduction gearbox housing and the distribution gearbox housing are detachably connected to each other. To this end, detachable fastening means are for instance provided, the fastening means being disposed on at least one of the housings in an easily accessible manner.

Furthermore, the invention is based on the object of providing a treatment installation for material treatment, the treatment installation ensuring a high flexibility and productivity in the operation of a twin-shaft extruder.

This object is achieved by a treatment installation for material treatment, comprising a gearbox assembly according to the invention, a drive motor coupled to the speed change gearbox, and a twin-screw extruder the screw shafts of which are coupled to the distribution gearbox. The advantages of the treatment installation according to the invention correspond to the advantages of the gearbox assembly according to the invention already described above. The treatment installation may in particular be further developed such as to have the features of the gearbox assembly. The treatment installation preferably has a reading unit allowing a coding element of the speed change gearbox to be read out as well as an associated control device allowing the drive motor and/or the twin screw extruder to be actuated depending on the information of the coding element having been read out. The coding element in particular contains information regarding the gear ratio of the speed change gearbox.

Furthermore, the invention is based on the object of providing a method for the startup of a treatment installation for material treatment, the method ensuring a high flexibility and productivity in the operation of a twin-screw extruder.

This object is achieved by a method for the startup of a treatment installation for material treatment, the method comprising the following steps: providing a treatment installation for material treatment, the treatment installation comprising a gearbox assembly comprising a first speed change gearbox for adjusting a screw shaft speed of two screw shafts of a twin-screw extruder, a distribution gearbox with two distribution gearbox output shafts allowing the screw shafts of the twin-screw extruder to be coupled thereto, a speed reduction gearbox that couples the first speed change gearbox to the distribution gearbox, the speed reduction gearbox having precisely one speed reduction gearbox input shaft, with a speed change gearbox output shaft of the speed change gearbox being detachably connected to the speed reduction gearbox input shaft in such a way that the speed reduction gearbox is separable from the first speed change gearbox, a drive motor coupled to the first speed change gearbox, and a twin-screw extruder the screw shafts of which are coupled to the distribution gearbox, separating the first speed change gearbox from the drive motor and the speed reduction gearbox, replacing the first speed change gearbox by a second speed change gearbox, coupling the second speed change gearbox to the drive motor and the speed reduction gearbox, and starting up the twin-screw extruder by means of the drive motor. The advantages of the method according to the invention correspond to the advantages of the gearbox assembly and the treatment installation according to the invention already described above. The method may in particular be further developed such as to have the features of one of the gearbox assemblies or the treatment installation according to the invention. The first speed change gearbox can be easily and quickly replaced by a second speed change gearbox. To this end, the first speed change gearbox is separated from the drive motor and the speed reduction gearbox and is then replaced. This is possible due to the fact that the speed change gearbox is physically separated from the speed reduction gearbox. As a result, the speed change gearbox forms an individual gearbox module, in other words an individual gearbox unit. The second speed change gearbox can be coupled to the drive motor and the speed reduction gearbox just as easily and quickly so that afterwards, the twin-screw extruder can be run up using the drive motor. In the event of a desired change of the gear ratio and/or an upcoming maintenance and/or a defect, the configuration of the gearbox assembly allows a quick startup or reinstatement of the treatment installation, with the result that the downtimes of the treatment installation are reduced. The method according to the invention allows a twin-screw extruder to be operated at high flexibility and productivity.

Further features, advantages and details of the invention will be apparent from the ensuing description of several exemplary embodiments.

DESCRIPTION OF THE PREFERRED EMBODIMENTS

Figure 1:
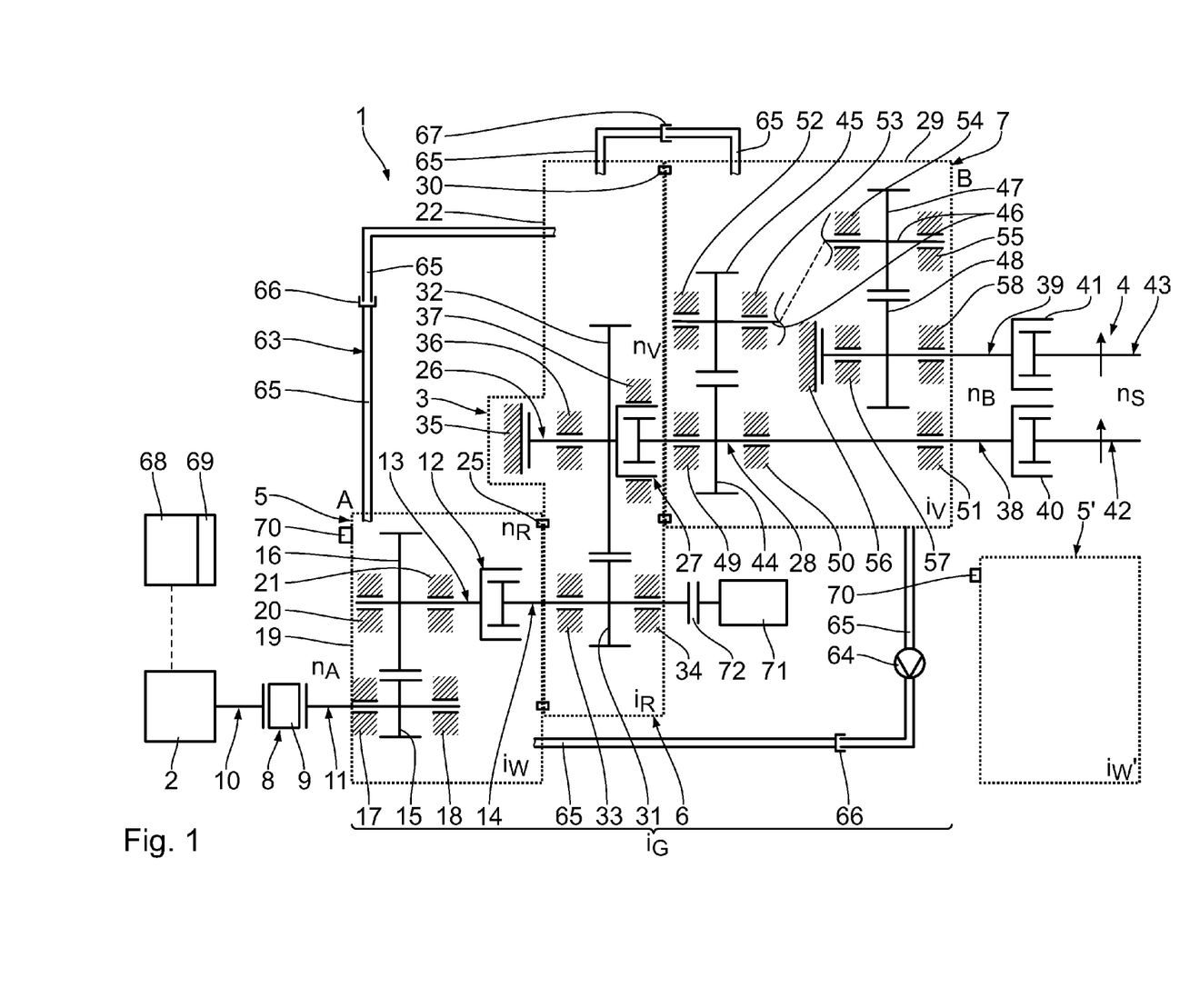
FIG. 1 shows a schematic diagram of a treatment installation for material treatment comprising a drive motor, a twin-screw extruder and an associated gearbox assembly according to a first exemplary embodiment.
Figure 2:
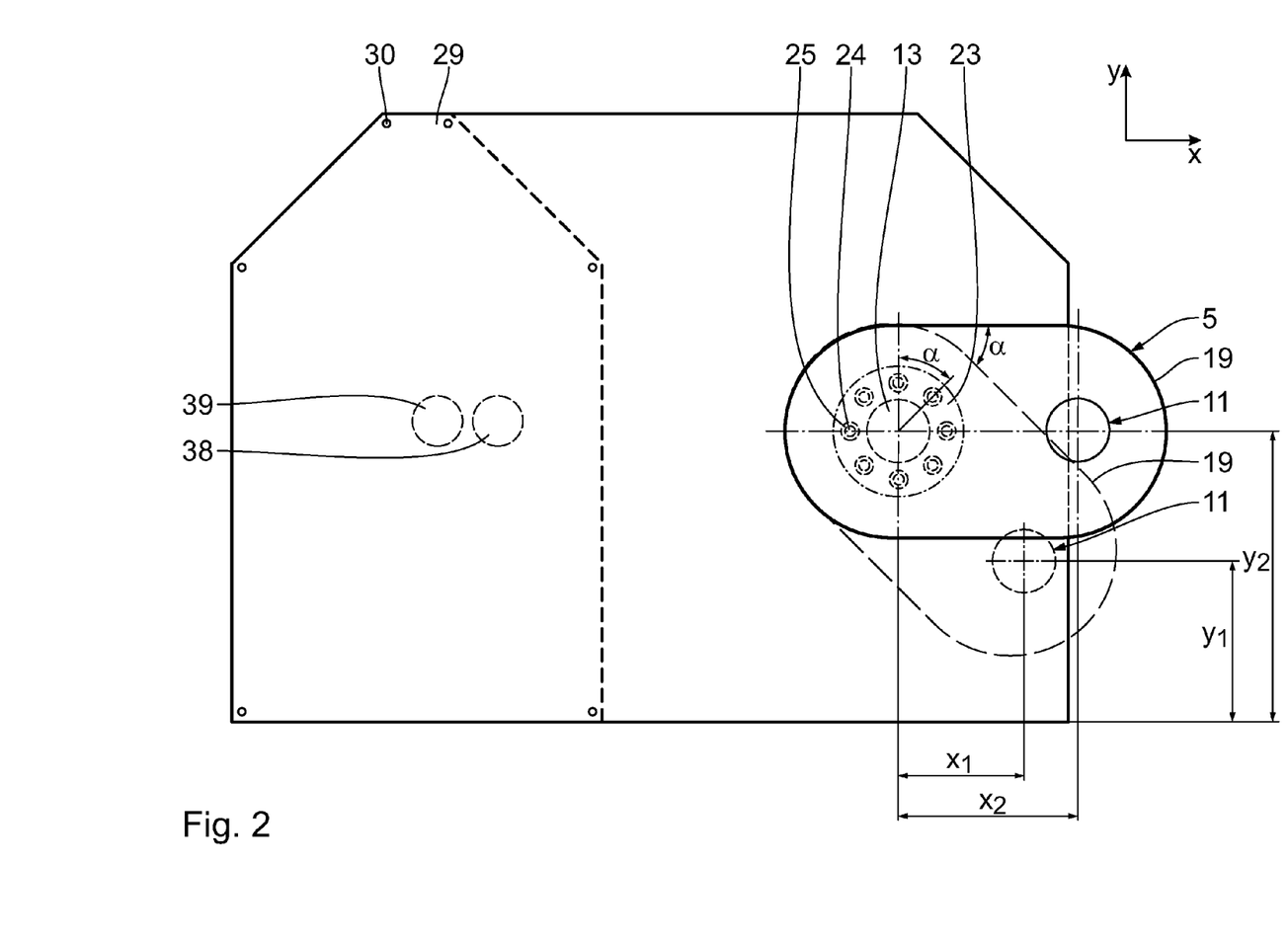
FIG. 2 shows a front view of the gearbox assembly in FIG. 1.
Figure 3:
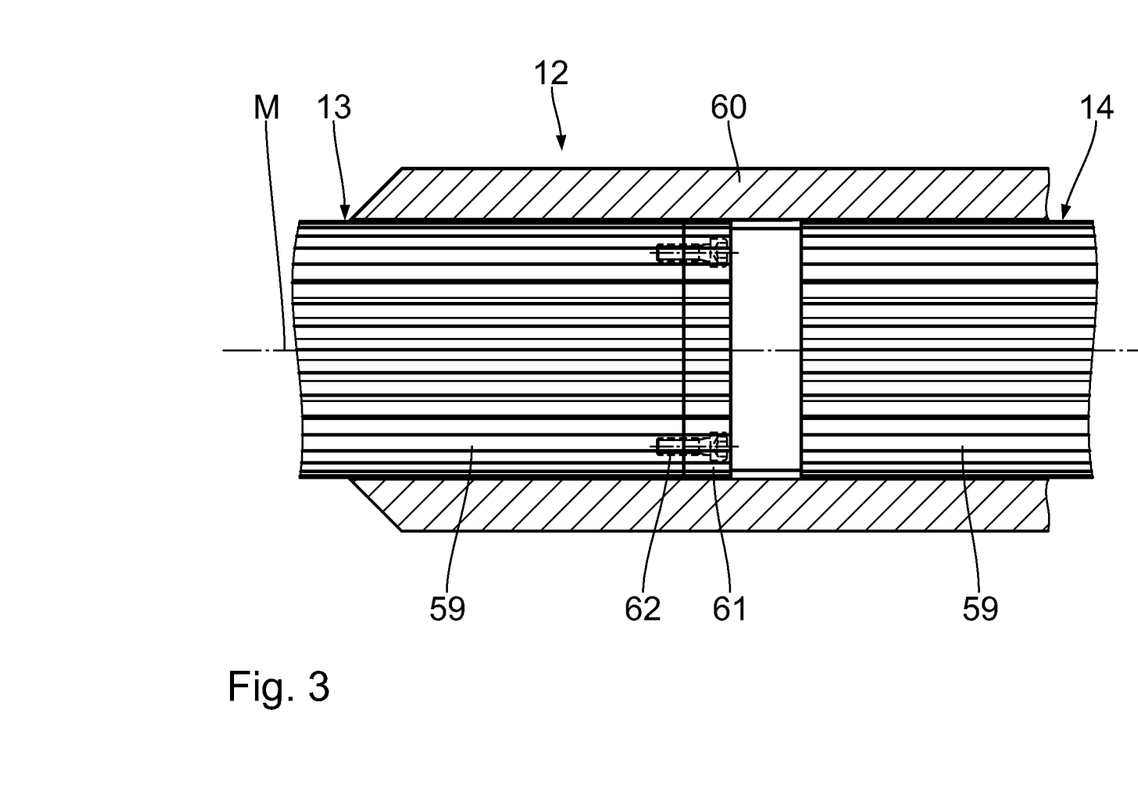
FIG. 3 shows a schematic illustration of a releasable shaft connection of a speed change gearbox and a speed reduction gearbox of the gearbox assembly in FIG. 1.

In the following sections, a first exemplary embodiment of the invention will be described with reference to FIGS. 1 to 3. A treatment installation 1 comprises a drive motor 2 that drives, via a gearbox assembly 3, a twin-screw extruder 4 for rotation in the same direction. The drive motor 2 is coupled to the gearbox assembly 3 via a coupling 8. The treatment installation 1 is used for material treatment, in particular for the treatment of plastic material.

The gearbox assembly 3 has a speed change gearbox 5 at a driving end A and a distribution gearbox 7 at an output end B, the gearboxes 5, 7 being mechanically connected, in other words coupled to each other, by means of a speed reduction gearbox 6. The gearbox assembly 3 has a gear ratio $i_G$ defined by an input drive motor speed $n_A$ and an output gearbox speed $n_B$, with $i_G$ being such that $i_G = n_A/n_B > 1$.

The speed change gearbox 5 is configured in a physically separated manner. To this end, the speed change gearbox 5 is configured such as to be separate from the speed change reduction gearbox 6, thus forming an individual gearbox module, in other words an individual gearbox unit. At the input end of the speed change gearbox 5, a drive shaft 10 of the drive motor 2 is detachably connected, via the coupling 8, to a speed change gearbox input shaft 11. To this end, a friction element 9 is arranged between a coupling element at the driving end, said coupling element being fastened to the drive shaft 10, and a coupling element at the gearbox end, said coupling element being fastened to the speed change gearbox input shaft 11, the friction element 9 being detachably connected to one of the coupling elements, in particular the coupling element at the gearbox end. The shaft connection between the drive shaft 10 and the speed change gearbox input shaft 11 can be separated by demounting the friction element 9. At the output end of the speed change gearbox 5, a detachable shaft connection 12 is formed that connects a speed change gearbox output shaft 13 of the speed change gearbox 5 to a speed reduction gearbox input shaft 14 of the speed reduction gearbox 6.

The speed change gearbox 5 has a single-stage configuration and has a gear ratio $i_W$ defined by the input speed $n_A$ and an output speed $n_R$. The gear ratio $i_W$ is such that $i_W = n_A/n_R \neq 1$. Depending on what is required, the gear ratio $i_W$ is therefore greater or smaller than 1. The gear ratio $i_W$ is defined by a first speed change gearbox gear 15 disposed on the input shaft 11 and a second speed change gearbox gear 16 disposed on the output shaft 13. The gears 15, 16 are in meshing engagement and are in particular configured as spur gears. The speed change gearbox input shaft 11 is mounted, by means of radial bearings 17, 18, to a speed change gearbox housing 19 of the speed change gearbox 5 on both sides of the first gear 15. Correspondingly, the speed change gearbox output shaft 13 is mounted, by means of radial bearings 20, 21, to the speed change gearbox housing 19 on both sides of the second gear 16. The radial bearings 17, 18, 20 and/or 21 in particular serve to absorb radial forces, the radial bearings may however also be configured in such a way as to absorb axial forces.

The speed change gearbox housing 19 is configured such as to be separate from a speed reduction gearbox housing 22 of the speed reduction gearbox 6. The speed change gearbox housing 19 is detachably connected to the speed reduction gearbox housing 22. To this end, the speed change gearbox housing 19 is provided with a connection portion 23. The connection portion 23 is configured as an annular flange arranged substantially concentrically to the output shaft 13. The connection portion 23 has a plurality of fastening holes 24 arranged around the output shaft 13. Through the fastening holes 24, fastening means 25, for instance screws, are guided, which are detachably secured to the speed reduction gearbox housing 22. Depending on the number and shape of the fastening holes 24, the speed change gearbox housing 19 can be secured to the speed reduction gearbox housing 22 in various angular positions a. The fastening holes 24 may for instance have the shape of a circle or of an elongated hole. The position of the input shaft 11 is changeable or adjustable depending on the angular position $\alpha$. In particular, the position of the input shaft 11 is adjustable in a horizontal x direction and/or a vertical y direction. For instance, FIG. 2 shows a first position $x_1$, $y_1$ and a second position $x_2$, $y_2$ of the input shaft 11 depending on the angular position $\alpha$.

The speed reduction gearbox 6 is configured such as to be separate from the speed change gearbox 5 and the distribution gearbox 7. The speed reduction gearbox 6 therefore forms an individual gearbox module, in other words an individual gearbox unit. As already described above, the speed reduction gearbox input shaft 14 is connected to the speed change gearbox output shaft 13 by means of the detachable shaft connection 12. A speed reduction gearbox output shaft 26 is detachably connected to a distribution gearbox input shaft 28 by means of another detachable shaft connection 27. Furthermore, the speed reduction gearbox housing 22 is configured such as to be separate from a distribution gearbox housing 29 of the distribution gearbox 7. The speed reduction gearbox housing 22 is detachably connected to the distribution gearbox housing 29. To this end, fastening means 30, for instance screws, are used, which are easily accessible.

The speed reduction gearbox 6 has a single-stage configuration and has a gear ratio $i_R$ defined by the input speed $n_R$ and an output speed $n_V$. The gear ratio $i_R$ is such that $i_R = n_R/n_V > 1$. The gear ratio $i_R$ is defined by a first speed reduction gearbox gear 31 at the input end and a second speed reduction gearbox gear 32 at the output end. The gears 31, 32 are in meshing engagement and are in particular configured as spur gears.

The speed reduction gearbox input shaft 14 is mounted to the housing 22 by means of radial bearings 33, 34 on both sides of the first gear 31. On a side remote from the distribution gearbox 7, the speed reduction gearbox output shaft 26 is mounted to the housing 22 by means of an axial bearing 35. Furthermore, the speed reduction gearbox output shaft 26 is mounted to the housing 22 by means of radial bearings 36, 37 on both sides of the second gear 32. The radial bearings 33, 34, 36 and/or 37 are in particular configured such as to absorb radial forces, they can however also be configured such as to absorb axial forces.

The distribution gearbox 7 is configured such as to be physically separated from the speed reduction gearbox 6 and the twin-screw extruder 4. The distribution gearbox 7 therefore forms an individual gearbox module, in other words an individual gearbox unit. The distribution gearbox input shaft 28 is detachably connected to the output shaft 26 of the speed reduction gearbox 6 by means of the shaft connection 27. The distribution gearbox 7 is further provided with two distribution gearbox output shafts 38, 39 connected to screw shafts 42, 43 of the twin-screw extruder 4 by means of shaft connections 40, 41 that are in each case detachable.

The distribution gearbox 7 has a gear ratio $i_V$ defined by the input speed $n_V$ and the output speed $n_B$. The gear ratio $i_V$ is such that $i_V = n_V/n_B = 1$. The distribution gearbox input shaft 28 is formed in one piece with the distribution gearbox output shaft 38, with the shaft 28 or 38, respectively, thus being continuous. For power distribution, the input shaft 28 is provided with a first distribution gearbox gear 44 that engages a second distribution gearbox gear 45. The second gear 45 is disposed on a distribution shaft 46 the output end of which is provided with a third distribution gearbox gear 47. The third gear 47 engages a fourth distribution gearbox gear 48 disposed on the distribution gearbox output shaft 39. The gears 44, 45, 47, 48 are for instance configured as spur gears.

The distribution gearbox input shaft 28 is mounted to the distribution gearbox housing 29 by means of two radial bearings 49, 50 on both sides of the first gear 44. Furthermore, the distribution gearbox output shaft 38 is mounted to the housing 29 by means of another radial bearing 51. The distribution shaft 46 is further mounted to the housing 29 by means of radial bearings 52 to 55, with the radial bearings 52, 53 being arranged on both sides of the second gear 45 while the radial bearings 54, 55 are arranged on both sides of the third gear 47. On a side remote from the twin-screw extruder 4, the distribution gearbox output shaft 39 is mounted to the housing 29 by means of an axial bearing 56. Furthermore, the distribution gearbox output shaft 39 is mounted to the housing 29 by means of two radial bearings 57, 58 on both sides of the fourth gear 48. The radial bearings 49, 50, 51, 52, 53, 54, 55, 57 and/or 58 are in particular configured such as to absorb radial forces, they can however also be configured such as to absorb axial forces.

The shaft connection 12 is configured in such a way that each of the speed change gearbox output shaft 13 and the speed reduction gearbox input shaft 14 has an end region 59 provided with external teeth, said end regions being non-rotationally interconnected by means of a sleeve provided with internal teeth 60. The sleeve 60 is fixed in an axial direction relative to the shafts 13, 14 by means of a disk 61 provided with external teeth. To this end, the disk 61 is secured to the front end of one of the shafts 13, 14 and rotated relative to the sleeve 60 about an axis of rotation M of the shafts 13, 14. The rotation about the axis of rotation M causes the sleeve 60 to be clamped between the disk provided with external teeth 61 and the end regions 59 provided with external teeth in such a way that the sleeve 60 is secured in the axial direction. The disk 61 is fastened to the front end of one of the end regions 59 by means of fastening means 62, for instance screws. In FIG. 3, the disk 61 is for instance fastened to the speed change gearbox output shaft 13. The detachable shaft connections 27 and 40, 41 are configured correspondingly.

The gearbox assembly 3 further comprises a lubrication device 63 comprising a lubricant pump 64 and a lubricant line 65. Starting from a lubricant reservoir not shown in more detail, the lubricant line 65 is in particular configured such as to form a cycle, the lubricant line 65 thus running to all lubrication spots of the gearbox assembly 3 before terminating in the lubricant reservoir again. The lubricant line 65 is only partly shown in FIG. 1.

Between the speed change gearbox 5 and the speed reduction gearbox 6, the lubricant line 65 runs outside the housings 19 and 22 and is provided with a predetermined separation point 66. Correspondingly, the lubricant line 65 runs outside the housings 19 and 29 between the speed change gearbox 5 and the distribution gearbox 7 as well and is provided with another predetermined separation point 66. Furthermore, the lubricant line 65 runs outside the housings 22 and 29 between the speed reduction gearbox 6 and the distribution gearbox 7 and is provided with a predetermined separation point 67. The predetermined separation points 66, 67 are in particular configured as quick-release couplings that are self-sealing in the separated state and self-locking in the connected state. The lubricant reservoir is for instance formed in the speed reduction gearbox 6. The treatment installation 1 has a control device 68 for control thereof. The control device 68 is in particular used to actuate the drive motor 2. For this purpose, the gear ratios $i_R$ and $i_V$ are stored in the control device 68. To read the gear ratio $i_W$ into the control device 68, a reading device 69 is provided that is able to read out a coding element 70 disposed on the speed change gearbox 5. The coding element 70 is for instance readable optically or mechanically by means of the reading device 69. The reading device 69 is in signal communication with the control device 68 to which the gear ratio $i_W$ is provided.

The treatment installation 1 has an auxiliary drive device 71 allowing the twin-screw extruder 4 to be emptied, the auxiliary drive device 71 being connected to the speed reduction gearbox input shaft 14 via a freewheel. To this end, the speed reduction gearbox input shaft 14 is guided out of the speed reduction gearbox housing 22 on a side remote from the speed change gearbox 5. In order to empty the twin-screw extruder 4, the auxiliary drive device 71 provides a high torque at a low speed. When the gearbox assembly is driven by means of the drive motor 2, the auxiliary drive device 71 is decoupled from the speed reduction gearbox input shaft 14 using the freewheel 72.

The following sections describe the startup and operation of the treatment installation 1:

In the operation of the treatment installation 1, the drive motor 2 drives the screw shafts 42, 43 of the twin-screw extruder 4 in the same direction, strictly speaking in the same direction of rotation. The drive motor speed $n_A$ is set, by means of the speed change gearbox 5, to a desired speed $n_R$ in accordance with the gear ratio $i_W$. Since the gear ratios $i_R$ and $i_V$ are not changed, the screw shaft speed $n_S$ and the gearbox speed $n_B$ of the gearbox assembly 3 are adjusted via the gear ratio $i_W$. For adjustment, the gear ratio $i_W$ can be selected such as to be greater or smaller than 1. The speed reduction gearbox 6 is used to reduce the input speed $n_R$ in such a way that the output speed $n_V$ is such that $n_V<n_R$. The distribution gearbox 7 distributes the driving power provided by the distribution gearbox input shaft 28 to the distribution gearbox output shafts 38, 39. Since the gear ratio $i_V=1$, the input speed $n_V$ is equal to the output speed $n_B$.

In order to change the screw shaft speed $n_S$ in relation to the drive motor speed $n_A$, the gear ratio $i_G$ of the gearbox assembly 3 is changed. This is done by replacing the entire first speed change gearbox 5 having the gear ratio $i_W$ by another second speed change gearbox having a different gear ratio. The second speed change gearbox ready to be installed is only indicated in FIG. 1 and designated by reference numeral 5', the second speed change gearbox having a gear ratio $i_W'$.

In order to replace the speed change gearbox 5, the lubricant pump 64 is shut off, causing the lubricant to flow back into the lubricant reservoir, which is for instance formed in the speed reduction gearbox 6. The speed change gearbox 5 is therefore free of lubricants, thus allowing it to be demounted. In a second step, the shaft connection between the drive motor 2 and the speed change gearbox is separated. To this end, the friction element 9 is demounted, and the fastening means 25 are then detached so that the housings 19 and 22 are no longer connected to each other.

The speed change gearbox 5 is now moved away from the speed reduction gearbox 6 in the axial direction, thus causing the shaft connection 12 to be separated. The shaft connection 12 is separated by removing the associated sleeve 60 from the speed reduction gearbox input shaft 14. The speed change gearbox 5 can now be removed by means of a lifting device not shown in more detail and replaced by the second speed change gearbox 5'.

The speed change gearbox 5' is now mounted in reverse order. To this end, the speed change gearbox 5' is moved, in a first step, towards the speed reduction gear 6 in the axial direction, causing the sleeve 60 arranged on the speed change gearbox output shaft 13 to be slid over the speed reduction gearbox input shaft 14. In a second step, the housings 19, 22 are connected to each other using the fastening means 25. When doing so, the connection portion 23 is mounted to the housing 22 in such a way that the speed change gearbox input shaft 11 is aligned coaxially with the drive shaft 10. Then a shaft connection is formed between the drive shaft 10 and the speed change gearbox input shaft 11 by mounting the friction element 9. The shaft connections thus formed connect the speed change gearbox 5' to the drive motor 2 and the speed reduction gearbox 6. Finally, the predetermined separation points 66, in other words the quick-release couplings 66, are connected again. In the meantime, the reading device 69 has read out the coding member 70 so as to determine the gear ratio $i_W'$, which was then transmitted to the control device 68. The control device 68 actuates the drive motor 2 depending on the gear ratio $i_W'$ and adjusts the screw shaft speed $n_S$.

The speed change gearbox 5 can be replaced in a corresponding manner in the event of an upcoming maintenance or a defect. Due to the fact that the speed change gearbox 5 is configured as an individual gearbox module, in other words an individual gearbox unit, the treatment installation 1 has a high flexibility and productivity in the operation of the twin-screw extruder 4. Since the entire speed change gearbox 5 is replaced, this results in low downtimes and therefore in a high availability of the treatment installation 1.

Furthermore, in the event of an upcoming maintenance and/or a defect, the speed reduction gearbox 6 and/or the distribution gearbox 7 being configured as separate gearbox modules, in other words as separate gearbox units, can be replaced as well by separating the respective shaft connections 12, 27, 40, 41 and by separating the predetermined separation points 66, 67 and housings 19, 22, 29, thus allowing downtimes to be reduced and the availability of the treatment installation 1 to be increased. Furthermore, the individual gearbox units 5, 6, 7 can be transported more easily.

Figure 4:
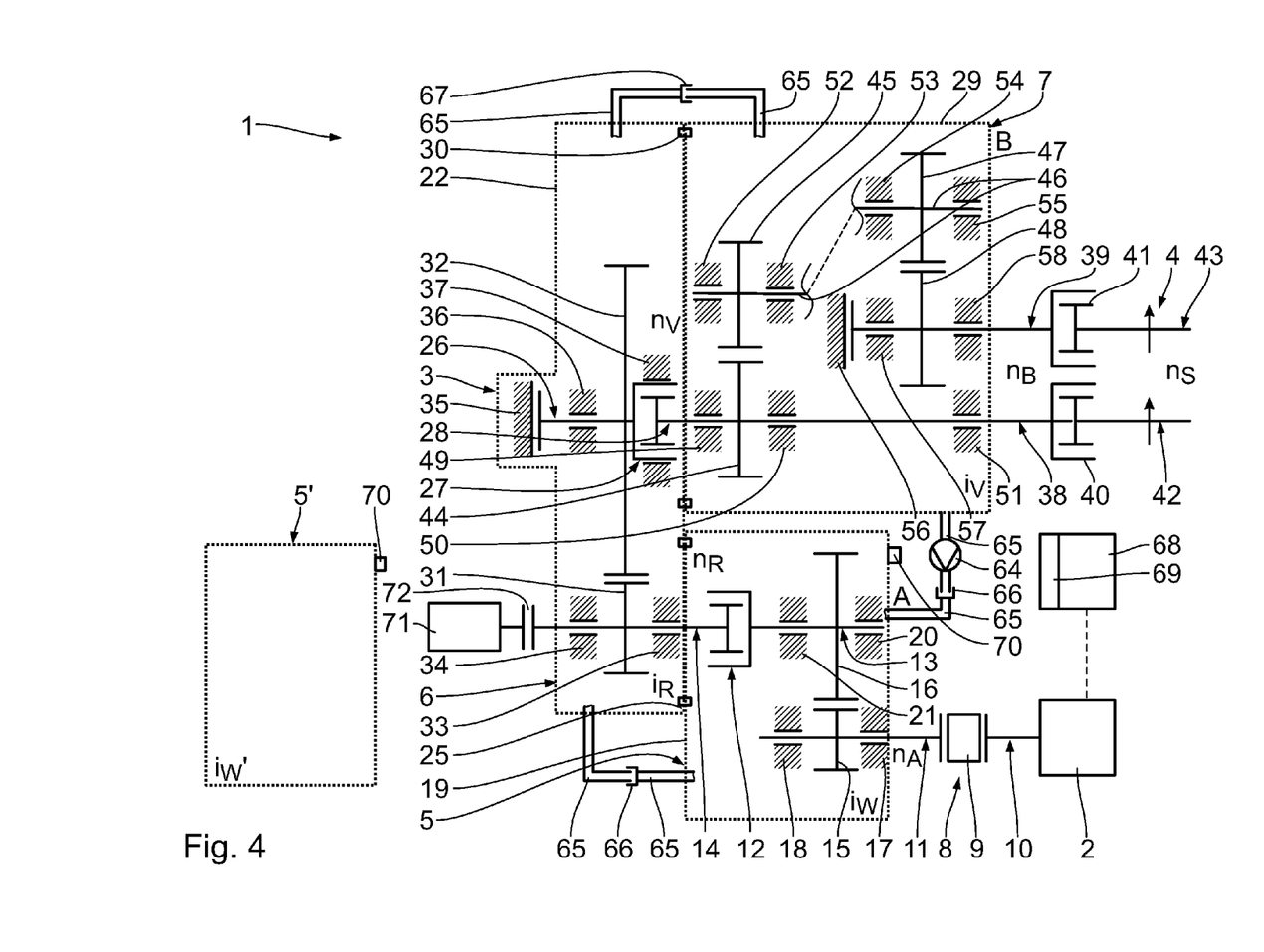
FIG. 4 shows a schematic diagram of a treatment installation for material treatment comprising a drive motor, a twin-screw extruder and an associated gearbox assembly according to a second exemplary embodiment.

The following section describes a second exemplary embodiment of the invention with reference to FIG. 4. In contrast to the first exemplary embodiment, the speed change gearbox 5, the speed reduction gearbox 6 and the distribution gearbox 7 are arranged in a U-shaped configuration. In other words, the drive motor 2 and the twin-screw extruder 4 are arranged on the same side of the gearbox assembly 3. This facilitates the replacement of the speed reduction gearbox 6. Further details concerning the design and functioning of the treatment installation 1 can be found in the description of the first exemplary embodiment.

Figure 5:
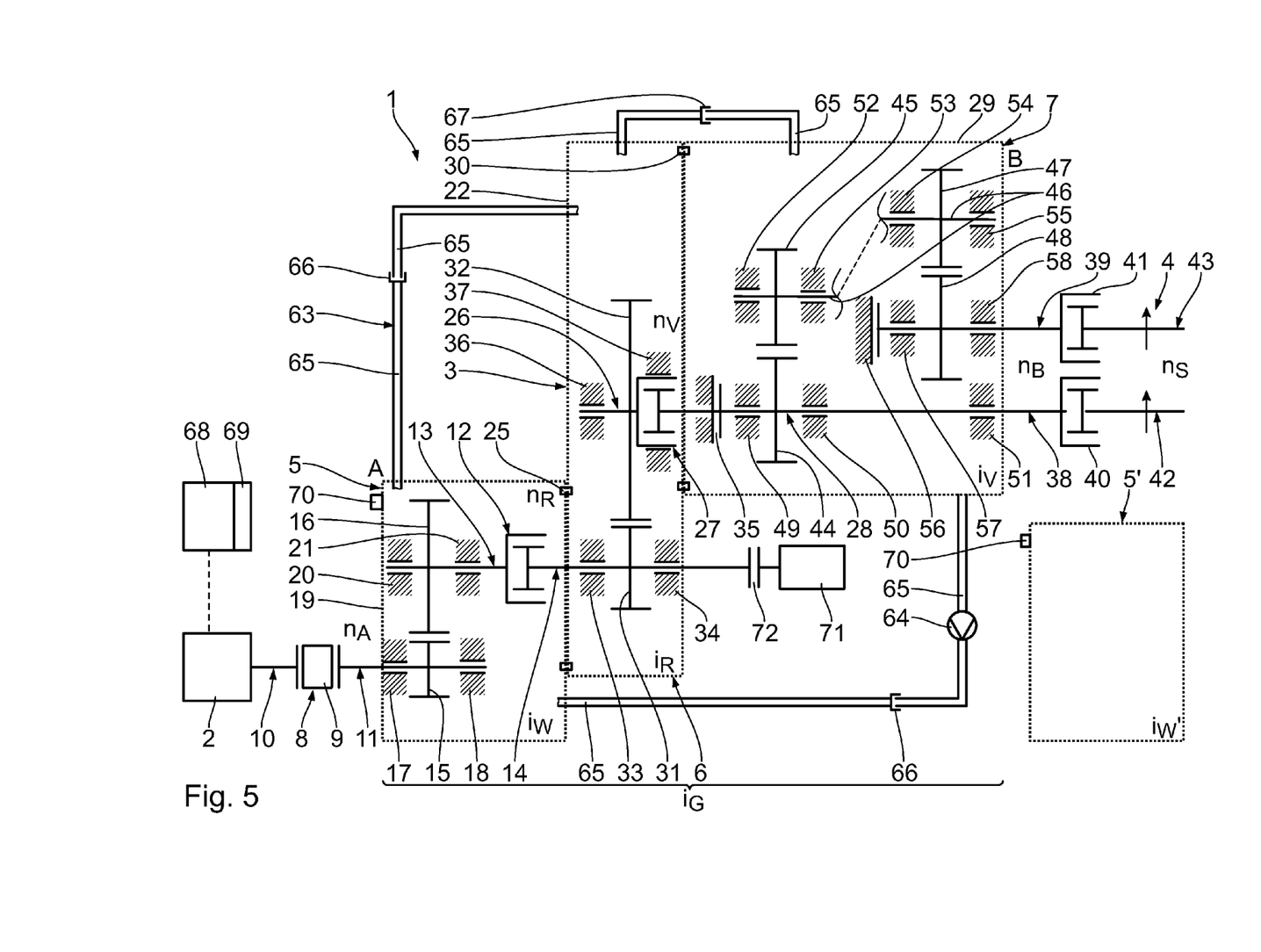
FIG. 5 shows a schematic diagram of a treatment installation for material treatment comprising a drive motor, a twin-screw extruder and an associated gearbox assembly according to a third exemplary embodiment.

The following section describes a third exemplary embodiment of the invention with reference to FIG. 5. In contrast to the preceding embodiments, the axial bearing 35 is arranged in the distribution gearbox 7. Further details concerning the design and functioning of the treatment installation 1 can be found in the descriptions of the preceding exemplary embodiment.

Since the gearbox assembly 3 does not have switching stages, the gearbox assembly 3 has a low complexity so the costs are kept to a minimum. Due to its low complexity, the gearbox assembly 3 furthermore has a high reliability and therefore a high availability.

Preferably, all bearings and gears in the gearbox assembly 3 are lubricated via pressure lines using oil as a lubricant. The lubrication device in particular has a central infeed and discharge spot. After being fed in, the flow of oil is distributed internally among the individual bearings and gears. At the transition to the speed change gearbox 5, the oil is fed from a pipe into a hose and then into an internal distribution system consisting of fixed pipes or fixed bores in the speed change gearbox 5. At the lowest point in the gearbox assembly 3, the oil is centrally recirculated back into the main oil reservoir of the gearbox assembly 3 via a passive outlet before being drawn into an oil treatment installation. The hoses at the connection points are provided with quick-release couplings that are easily separable for demounting, are self-sealing in the separated state and self-locking in the connected state, and are protected against unauthorized opening.

What is claimed is:

1. A gearbox assembly for a twin-screw extruder, comprising:
   a speed change gearbox for adjusting a screw shaft speed of shafts of a twin-screw extruder;
   a speed reduction gearbox; and
   a distribution gearbox with two distribution gearbox output shafts allowing the screw shafts of the twin-screw extruder to be coupled thereto, wherein the speed change gearbox is arranged at a driving end, wherein the speed reduction gearbox couples the speed change gearbox to the distribution gearbox, wherein the speed reduction gearbox has precisely one speed reduction gearbox input shaft, the precisely one speed reduction gearbox input shaft having a first speed reduction gearbox gear and a speed reduction output shaft having a second speed reduction gearbox gear, the first speed reduction gearbox gear and the second speed reduction gearbox gear being in meshing engagement, wherein a speed change gearbox output shaft of the speed change gearbox is detachably connected to the precisely one speed reduction gearbox input shaft so that the speed change gearbox and the speed reduction gearbox are configured such as to be separable from each other, wherein a speed change gearbox housing of the speed change gearbox and a speed reduction gearbox housing of the speed reduction gearbox are configured such as to be separate from each other.

2. The gearbox assembly according to claim 1, wherein the speed change gearbox has a speed change gearbox input shaft at the driving end allowing a drive motor to be detachably coupled thereto.

3. The gearbox assembly according to claim 1, wherein the speed change gearbox output shaft has a gear disposed at the output end thereof, and wherein the speed change gearbox output shaft is mounted, by means of radial bearings, on both sides of the gear.

4. The gearbox assembly according to claim 3, wherein the speed change gearbox output shaft is mounted to a speed change gearbox housing.

5. The gearbox assembly according to claim 1, wherein the precisely one speed reduction gearbox input shaft has the first speed reduction gearbox gear disposed at the input end thereof, and wherein the precisely one speed reduction gearbox input shaft is mounted, by means of radial bearings, on both sides of the first speed reduction gearbox gear.

6. The gearbox assembly according to claim 5, wherein the precisely one speed reduction gearbox input shaft is mounted to the speed reduction gearbox housing.

7. The gearbox assembly according to claim 1, wherein a speed change gearbox input shaft and the speed change gearbox output shaft are mounted to the speed change gearbox housing, wherein the speed change gearbox housing has a connection portion for connection to the speed reduction gearbox housing, the connection portion being configured in such a way that the speed change gearbox input shaft is positionable in a plurality of angular positions relative to the speed change gearbox output shaft.

8. The gearbox assembly according to claim 1, wherein at least one lubricant line having a predetermined separation point runs between the speed change gearbox and the speed reduction gearbox.

9. The gearbox assembly according to claim 8, wherein the predetermined separation point of the at least one lubricant line is arranged outside the speed change gearbox housing and the speed reduction gearbox housing.

10. The gearbox assembly according to claim 1, wherein the speed change gearbox has a coding element for reading out a gear ratio.

11. The gearbox assembly according to claim 1, wherein the speed reduction gearbox output shaft is detachably connected to a distribution gearbox input shaft of the distribution gearbox.

12. The gearbox assembly according to claim 1, wherein the speed reduction gearbox has the speed reduction gearbox output shaft and the second speed reduction gearbox gear is disposed at the output end thereof, and the speed reduction gearbox output shaft is mounted, by means of radial bearings, on both sides of the second speed reduction gearbox gear.

13. The gearbox assembly according to claim 12, wherein the speed reduction gearbox output shaft is mounted to the speed reduction gearbox housing.

14. The gearbox assembly according to claim 1, wherein the distribution gearbox has a distribution gearbox input shaft and a gear disposed at the input end thereof, and wherein the distribution gearbox input shaft is mounted, by means of radial bearings on both sides of the gear.

15. The gearbox assembly according to claim 14, wherein the distribution gearbox input shaft is mounted to a distribution gearbox housing.

16. The gearbox assembly according to claim 1, wherein the speed reduction gearbox housing and a distribution gearbox housing of the distribution gearbox are configured such as to be separate from each other.

17. A gearbox assembly according to claim 1, wherein the speed reduction gearbox has a gear ration of $i_R$ defined by an input speed $n_R$ of the precisely one speed reduction gearbox input shaft and by an output speed of $n_V$ of the speed reduction gearbox output shaft, wherein the gear ratio $i_R$ is constant such that: $i_R = n_R/n_V > 1$.

18. A treatment installation for material treatment, comprising:
a twin-screw extruder comprising two screw shafts;
a gearbox assembly comprising a speed change gearbox for adjusting a screw shaft speed of the two screw shafts of the twin-screw extruder, a speed reduction gearbox and a distribution gearbox with two distribution gearbox output shafts allowing the screw shafts of the twin-screw extruder to be coupled thereto, wherein the speed change gearbox is arranged at a driving end, wherein the speed reduction gearbox couples the speed change gearbox to the distribution gearbox, wherein the speed reduction gearbox has precisely one speed reduction gearbox input shaft, the precisely one speed reduction gearbox input shaft having a first speed reduction gearbox gear and a speed reduction gearbox output shaft having a second speedreduction gearbox gear, the first speed reduction gearbox gear and the second speed reduction gearbox gear being in meshing engagement, wherein a speed change gearbox output shaft of the speed change gearbox gear is detachably connected to the speed reduction gearbox input shaft so that the speed change gearbox and the speed reduction gearbox are configured such as to be separable from each other, wherein a speed change gearbox housing of the speed change gearbox and a speed reduction gearbox housing of the speed reduction gearbox are configured such as to be separate from each other; and
a drive motor coupled to the speed change gearbox.

* * * * *